United States Patent
Tunali et al.

(10) Patent No.: US 9,967,057 B1
(45) Date of Patent: May 8, 2018

(54) SYSTEM AND METHOD FOR COMPUTING LOG LIKELIHOOD RATIOS

(71) Applicant: Xilinx, Inc., San Jose, CA (US)

(72) Inventors: Nihat E. Tunali, Campbell, CA (US); Michael Wu, Palo Alto, CA (US); Hai-Jo Tarn, Saratoga, CA (US); Christopher H. Dick, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days. days.

(21) Appl. No.: 15/345,353

(22) Filed: Nov. 7, 2016

(51) Int. Cl.
*H04L 27/06* (2006.01)
*H04L 1/00* (2006.01)
*G06F 17/18* (2006.01)

(52) U.S. Cl.
CPC ............ *H04L 1/0045* (2013.01); *G06F 17/18* (2013.01)

(58) Field of Classification Search
CPC .............................. H04L 1/0045; G06F 17/18
USPC ........................................................ 375/340
See application file for complete search history.

(56) References Cited

U.S. PATENT DOCUMENTS

| | | | |
|---|---|---|---|
| 5,835,530 A * | 11/1998 | Hawkes | H04B 17/27 375/224 |
| 6,594,318 B1 * | 7/2003 | Sindhushayana | H03M 13/2957 375/262 |
| 7,076,000 B2 * | 7/2006 | Rodriguez | H04L 1/005 375/262 |
| 8,019,024 B2 | 9/2011 | Guerrieri et al. | |
| 8,457,184 B2 | 6/2013 | Chappaz | |
| 8,793,551 B2 * | 7/2014 | Zhou | H03M 13/253 714/752 |
| 8,793,560 B2 | 7/2014 | Sidi et al. | |
| 2007/0260959 A1 * | 11/2007 | Sidi | H03M 13/256 714/755 |

* cited by examiner

Primary Examiner — Helene Tayong
(74) Attorney, Agent, or Firm — David O'Brien; Hong Shi

(57) ABSTRACT

A method includes communicating data in a channel. Received symbols for the data correspond to points of a received symbol space respectively. First and second dimensions of the received symbol space correspond to a real part and an imaginary part of the received symbols respectively. A first received symbol for the data is obtained. A first region of the received symbol space for the first received symbol is determined. A first regression model associated with the first region and a first bit of the first received symbol is retrieved from a storage. The first regression model includes a plurality of regressors. A first log-likelihood ratio (LLR) for the first bit of the first received symbol is estimated using the first regression model.

20 Claims, 11 Drawing Sheets

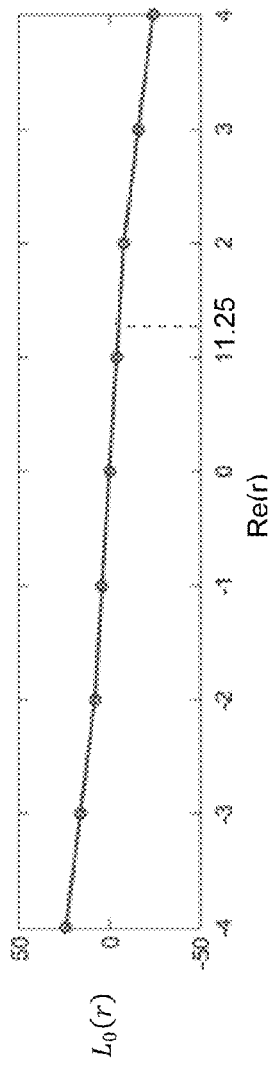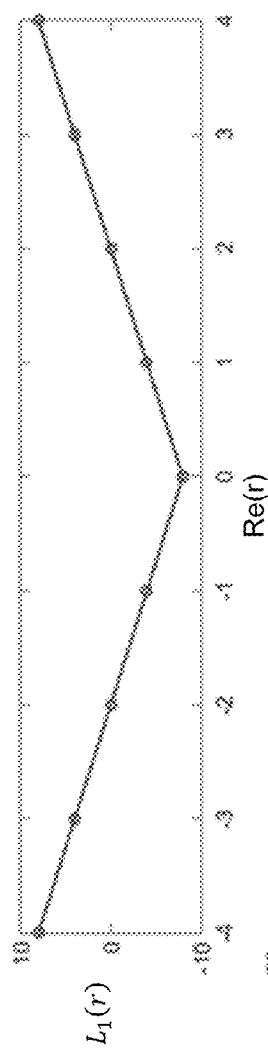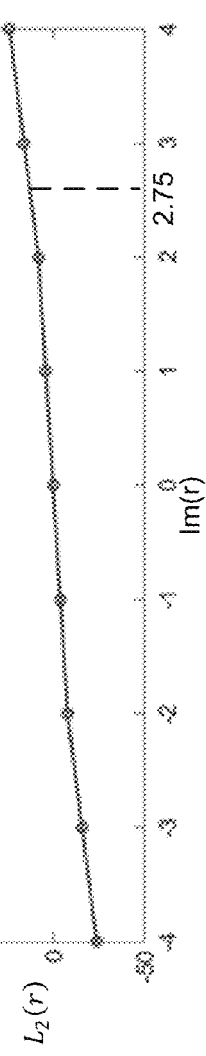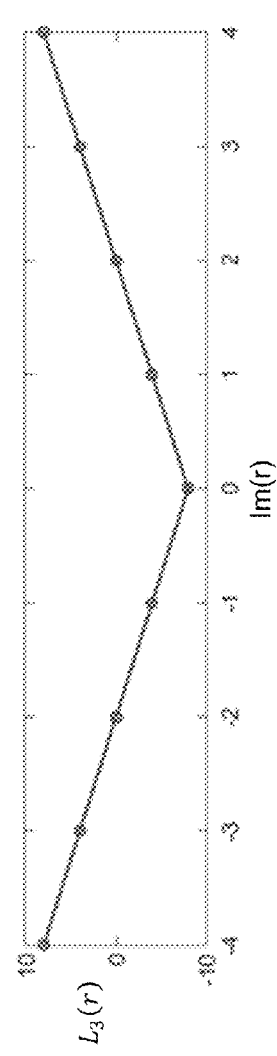

SYSTEM AND METHOD FOR COMPUTING LOG LIKELIHOOD RATIOS

FIELD

Examples of the present disclosure generally relate to integrated circuits ("ICs") and, in particular, to an embodiment related to a system for computing log-likelihood ratios ("LLR").

BACKGROUND

In communication systems, a transmitter may encode data based on a coding scheme to obtain code bits, and further map the code bits to modulation symbols based on a modulation scheme. The transmitter may further process the modulation symbols to generate a modulated signal. Such a modulated signal may be transmitted via a communication channel, which may distort the transmitted signal with a channel response, and degrade the signal with noise and interference.

A receiver receives the transmitted signal and processes the received signal to obtain received symbols, which may be distorted and noisy versions of the modulation symbols sent by the transmitter. The receiver may then compute LLRs for the code bits (also referred to as bits) based on the received symbols. The receiver may then decode the LLRs to obtain decoded data, which is an estimate of the data sent by the transmitter.

The computation for the LLRs may be complex and computationally intensive. Furthermore, good decoding performance may require accurate LLRs. Accordingly, it would be desirable and useful to provide an improved system to compute LLRs efficiently and accurately.

SUMMARY

In some embodiments in accordance with the present disclosure, a method includes communicating data in a channel, wherein received symbols for the data correspond to points of a received symbol space respectively, and wherein first and second dimensions of the received symbol space correspond to a real part and an imaginary part of the received symbols respectively; obtaining a first received symbol for the data; determining a first region of the received symbol space for the first received symbol; retrieving, from a memory, a first regression model associated with the first region and a first bit of the first received symbol, wherein the first regression model includes a plurality of regressors; and estimating a first log-likelihood ratio (LLR) for the first bit of the first received symbol using the first regression model.

In some embodiments, the data is modulated with a non-Gray coded modulation.

In some embodiments, the first regression model is a multiple linear regression model including a first regressor associated with a real part of the first received symbol and a second regressor associated with an imaginary part of the first received symbol.

In some embodiments, the first regression model includes a third regressor associated with a product of the first regressor and the second regressor.

In some embodiments, the first regression model includes an intercept coefficient determined based on a second LLR corresponding to a starting point of the first region.

In some embodiments, the starting point of the first region corresponds to a first integer part of the real part of the first received symbol in the first dimension, and corresponds to a second integer part of the imaginary part of the first received symbol in the second dimension.

In some embodiments, the first regressor corresponds to a fractional part of the real part of the first received symbol, and the second regressor corresponds to a fractional part of the imaginary part of the first received symbol.

In some embodiments, the method includes prior to communicating the data in the channel, performing a preparation process including partitioning the received symbol space into a plurality of regions; and for each region, determining a regression model associated with each bit of a plurality of bits of the received symbols; and storing the regression model in the memory.

In some embodiments, determining the regression model for the region includes: estimating a plurality of regression coefficients of the regression model based on LLRs corresponding to sample points of the region using an ordinary least squares (OLS) method.

In some embodiments, each region has a length of one in the first dimension and a length of one in the second dimension.

In some embodiments in accordance with the present disclosure, an integrated circuit (IC) includes a log-likelihood ratio (LLR) computation circuit configured to obtain a first received symbol for data communicated in a channel; determine a first region of a received symbol space associated with the first received symbol, wherein the received symbol space has first and second dimensions corresponding to a real part and an imaginary part of received symbols for the data communicated in the channel respectively; retrieve, from a storage, a first regression model associated with the first region and a first bit of the first received symbol, wherein the first regression model includes a plurality of regressors; and estimate a first LLR for the first bit of the first received symbol using the first regression model.

In some embodiments, the IC includes the storage coupled to the LLR computation circuit and a preparation unit. The preparation unit is configured to prior to communicating the data in the channel, perform a preparation process including: partitioning the received symbol space into a plurality of regions; for each region of the plurality of regions, determining a regression model associated with a bit of a plurality of bits of the received symbols; and storing the regression model in the storage.

Other aspects and features will be evident from reading the following detailed description and accompanying drawings.

BRIEF DESCRIPTION OF THE DRAWINGS

FIGS. 4A, 4B, 4C, and 4D illustrate LLR functions according to some embodiments of the present disclosure.

DETAILED DESCRIPTION

Figure 1:
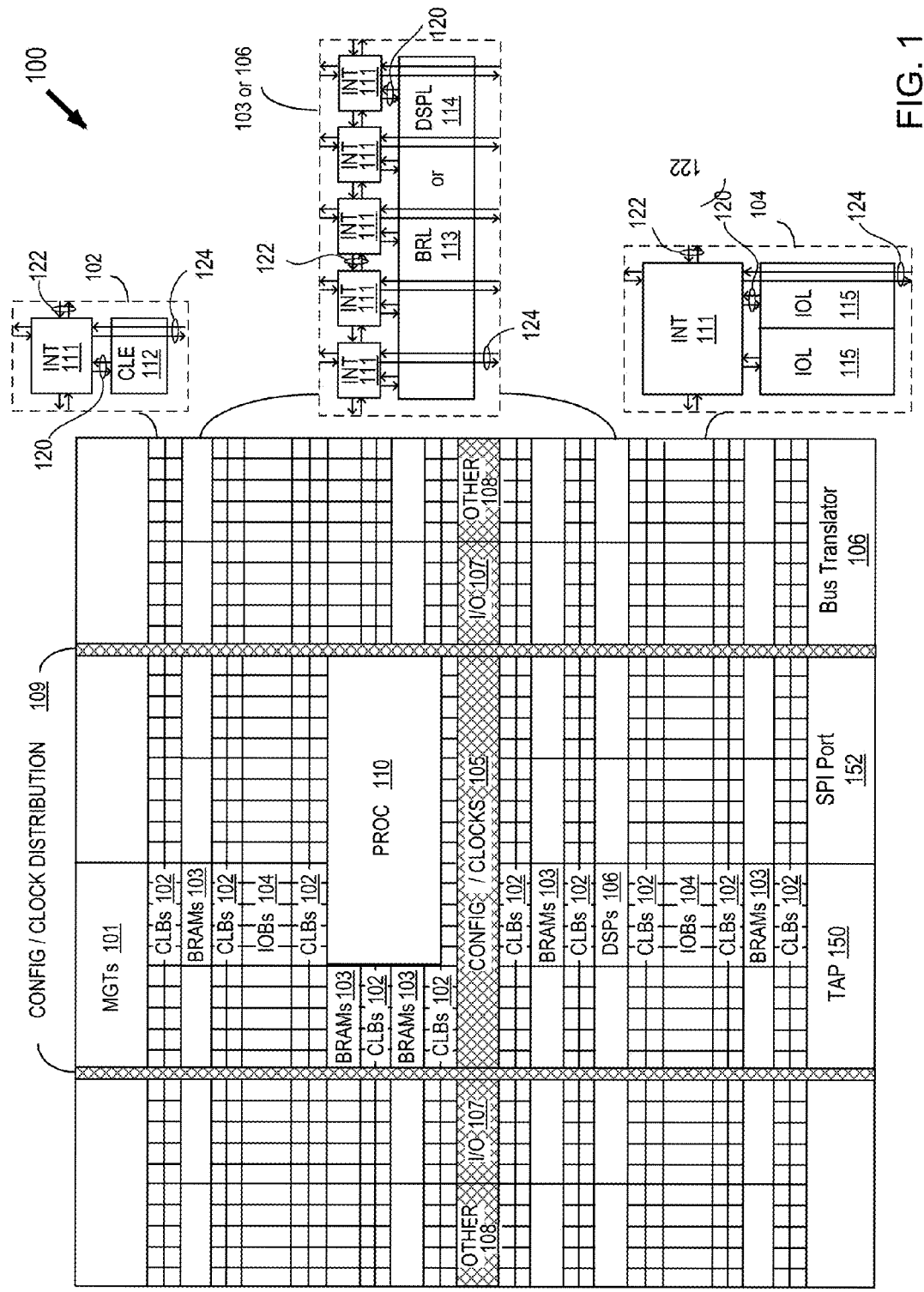
FIG. 1 is a block diagram illustrating an exemplary architecture for an IC according to some embodiments of the present disclosure.

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. The computation for the LLRs may be complex and computationally intensive. For integrated circuit (IC) solutions, it has been discovered that linear regression models may be used to derive LLRs. In some examples where Gray coded modulations are used, LLRs may be piecewise linear within intervals of one. In such examples, LLRs may be computed based on the piecewise linear functions. In some examples where non-Gray coded modulations are used and LLRs are not piecewise linear within intervals of one, a received symbol space may be partitioned into regions, and linear regression models may be estimated locally for each region. In some embodiments of the present disclosure, such linear regression models may be pre-computed and stored in a storage (e.g., a lookup (LUT) table). By using such pre-computed linear regression models, LLRs may be efficiently computed for both Gray coded modulation and non-Gray coded modulation with little performance degradation.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device (CPLD). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An 10B 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the LLR computation is not limited to the exemplary IC depicted in FIG. 1, and that IC having other configurations, or other types of IC, may also implement the LLR computation.

Figure 2:
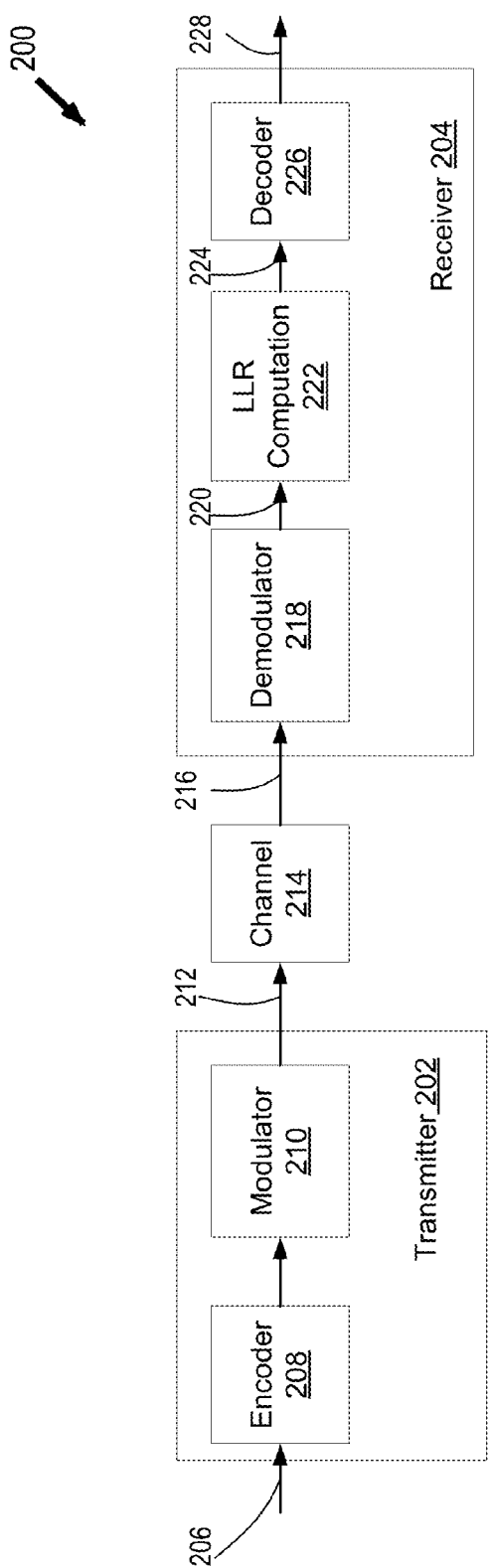
FIG. 2 is a block diagram illustrating an exemplary communication system according to some embodiments of the present disclosure.

FIG. 2 is a block diagram depicting an exemplary communication system 200 in. Communication system 200 includes a transmitter 202 and a receiver 204. The transmitter 202 includes an encoder 208 receiving data 206. Encoder 208 may encode the data 206 based on a coding scheme, and generate encoded bits. The coding scheme may be a forward error correction (FEC) code (e.g., low density parity check (LDPC) code). The encoded bits provided by encoder 208 is sent to modulator 210.

In some embodiments, modulator 210 may assign encoded bits to modulation symbols according to a modulation scheme. In some embodiments, an M-ary modulation has a number M of constellation points, where M is a power of two. Each set of K consecutive code bits may be mapped into an M-ary symbol s, where $K=\log_2(M)$. The modulator 210 may modulate the encoded data provided by the encoder 208 to generate modulated data 212, which is transmitted using a transmit antenna via a communication channel 214.

In some embodiments, receiver 204 receives signal 216 from receive antennas. A demodulator 218 processes the received signal 216 to obtain received symbols 220. The received symbols 220 are sent to an LLR computation system 222, which computes LLRs 224 for code bits based on the received symbols. LLRs may be used in estimating the posterior probability of whether a transmitted code bit was '0' or '1' based on channel statistics and the received symbol. In other words, LLRs give a measure of how likely the transmitted code bit was a 0 or a 1, and may also be referred to as soft decisions. LLRs 224 may be forwarded to a decoder 226 (e.g., a soft decision FEC code), which decodes LLRs 224 to provide decoded data 228.

The transmitter 202 and receiver 204 and each of their blocks may be implemented in hardware, software, or a combination of hardware and software. For purposes of clarity and not limitation, in some embodiments, the transmitter 202 and receiver 204 and each of their blocks may be implemented using various hardware resources, such as for example DSP slices, BRAM, and programmable resources of an FPGA; however, in other embodiments, digital signal processors, microprocessors, multi-core processors, memory, and/or other hardware may be used.

Figure 3:
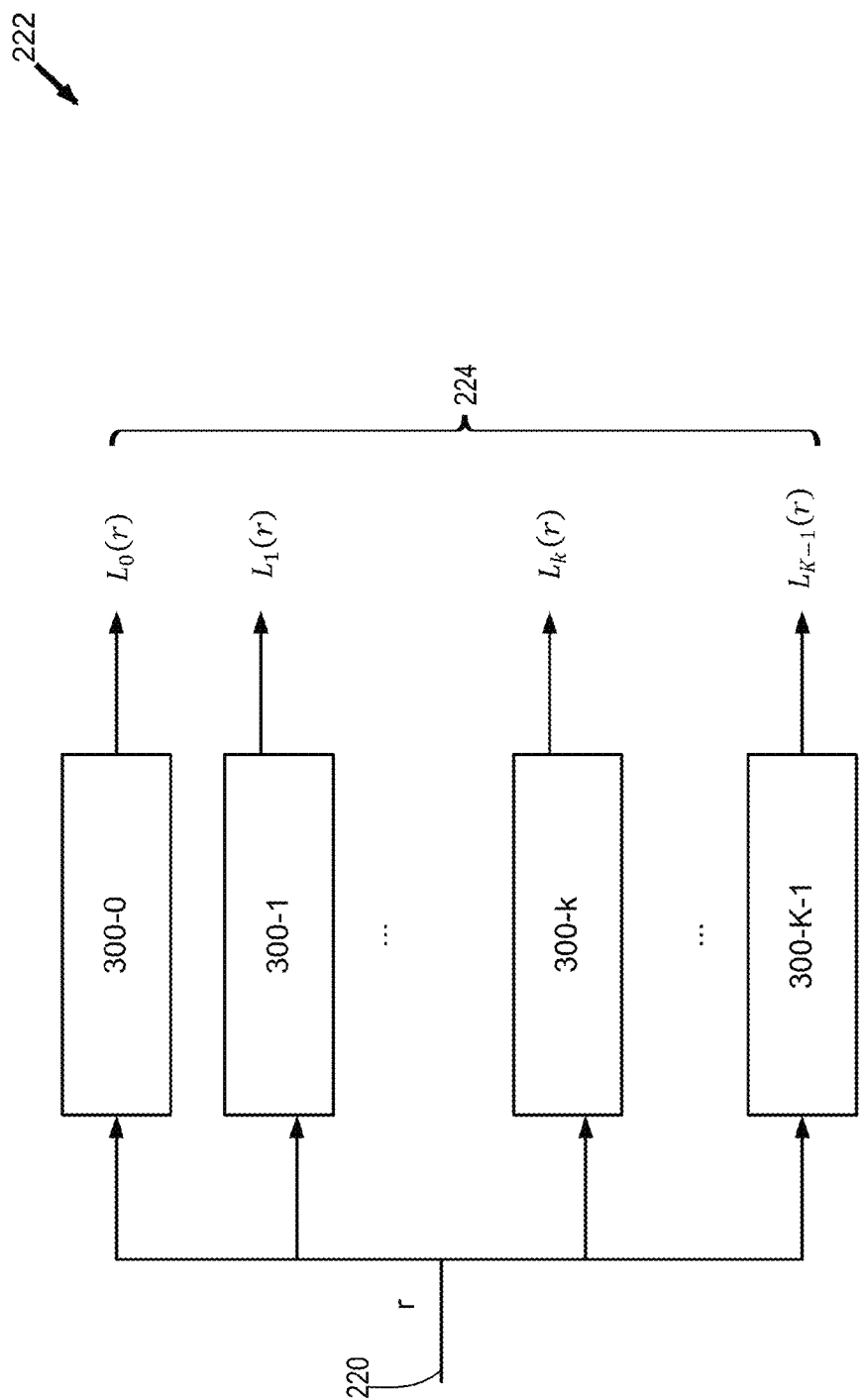
FIG. 3 is a block diagram illustrating an exemplary LLR computation system according to some embodiments of the present disclosure.

Referring to FIG. 3, an LLR computation system 222 for computing LLRs for bits of a received symbol is illustrated. LLR computation system 222 receives a received symbol r, and sends the received symbol r to LLR computation bit units 300-0 through 300-K–1, where each LLR computation bit unit is configured to compute LLR for the corresponding $k^{th}$ bit of the received symbol r.

As discussed above with reference to FIG. 2, in an M-ary modulation, each symbol s represents K code bits. In some examples, symbol s is transmitted over an additive white Gaussian noise channel 214 with standard deviation a. LLR for the $k^{th}$ bit of received symbol r, denoted as $L_k(r)$, may be computed as follows:

$$L_k(r) = \ln\left(\frac{\sum_{s \in S | s_k = 0} e^{-|r-s|^2/\sigma^2}}{\sum_{s \in S | s_k = 1} e^{-|r-s|^2/\sigma^2}}\right),$$ Equation (1)

where $s_k$ denotes the $k^{th}$ bit in the symbol s, and k is an integer between 0 and K–1.

In some embodiments, LLR computation bit unit 300-$k$ may compute LLRs using the following approximation:

$$L_k(r) = \frac{1}{\sigma^2}(\min|r-s|^2 - \min|r-s'|^2),$$ Equation (2)

where $s \in S|(s_k=0)$, $s' \in S|(s_k=1)$, $s_k$ denotes the $k^{th}$ bit of symbol s, and k is an integer between 0 and K–1.

Computing LLRs directly using equation (2) may be computationally intensive. For example, it is computationally costly to find the minimum values as provided in equation (2). As described in detail below, in various embodiments, LLR computation bit unit 300-$k$ may use lookup tables the LLRs (exactly or approximately) to compute LLRs efficiently.

Referring to FIGS. 4A, 4B, 4C, 4D, and 5, in some embodiments, the modulator 210 of FIG. 2 performs Gray-coded modulations (e.g., quadrature amplitude modulation (QAM)). In such embodiments, $L_k(r)$ of equation (2) is piecewise linear as a function of either the real part of r (denoted as Re(r)) or the imaginary part of r (denoted as Im(r)) within intervals of one. For example, in 16-QAM, LLRs of some bits (e.g., $L_0(r)$, $L_1(r)$) may be piecewise linear as a function of Re(r) within intervals of one, while LLRs of other bits (e.g., $L_2(r)$, $L_3(r)$) of that symbol may be piece linear as a function of Im(r) within intervals of one.

In some embodiments, with Gray-coded modulations, $L_k(r)$ of equation (2) may be computed in exact based on corresponding linear functions, where parameters of those linear functions may be stored in a memory (e.g., lookup tables). In such embodiments, the hefty computation of minimum values provided in equation (2) may be avoided.

Referring to FIGS. 4A, 4B, 4C, and 4D, $L_k(r)$ of equation (2) as a piecewise linear function of either Re(r) or Im(r) for 16-QAM is illustrated. Referring to FIGS. 4A and 4B, $L_0(r)$ and $L_1(r)$ of equation (2) are piecewise linear as a function of Re(r), and may be computed in exact based on those linear functions. For example, $L_0(r)$ of equation (2) for 16-QAM has the same value as $L_0$ (Re(r)), which may be computed using a linear function as follows:

$L_0(Re(r)) = L_0(\text{floor}(Re(r))) + f1^{**}\text{slope between}$
$L_0(\text{floor}(Re(r)))$ and $L_0(\text{floor}(Re(r))+1)$, where f1 is a fractional part of Re(r). The parameters (e.g., $L_0$ (floor (Re(r)) also referred to as an intercept term, the slope) of the linear function may be pre-computed and stored in a memory. In an example, for a received symbol r having a value of 1.25+2.75i, $L_0(1.25+2.75i)$ may be computed as follows:

$L_0(1.25+2.75i) = L_0(1.25) = L_0(1) + 0.25^*\text{slope between}$
$L_0(1)$ and $L_0(2)$.

In some embodiments, $L_0(1)$ and the slope between $L_0(1)$ and $L_0(2)$ are pre-computed and stored in a memory. Thus, in this computation, only the fractional part of 1.25, the LLR value $L_0(1)$, and the slope between $L_0(1)$ and $L_0(2)$ are used. The parameters (e.g., slopes and intercept terms) of all the piecewise linear lines may be pre-computed and stored into lookup tables indexed based on floor(Re(r)).

Referring to FIGS. 4C and 4D, $L_2(r)$ and $L_3(r)$ of equation (2) are piecewise linear as a function of Im(r), and may be computed in exact based on those linear functions. For example, $L_2(r)$ of equation (2) for 16-QAM has the same value as $L_2$ (Im(r)), which may be computed using a linear function as follows:

$$L_2(r)=L_2(\text{floor}(Im(r))i)+f2**\text{slope between } L_2(\text{floor}(Im(r))i) \text{ and } L_2((\text{floor}(Im(r))+1)i),$$

where f2 is a fractional part of Im(r). The parameters (e.g., $L_2$ (floor (Im(r))i)) also referred to as intercept term, the slope) of the linear function may be pre-computed and stored in a memory. In an example, for a received symbol r having a value of 1.25+2.75i, $L_2(1.25+2.75i)$ may be computed as follows:

$$L_2(1.25+2.75i)=L_2(2.75i)=L_2(2i)+0.75*\text{slope between } L_2(2i) \text{ and } L_2(3i).$$

In some embodiments, $L_2(2i)$ and the slope between $L_2(2i)$ and $L_2(3i)$ are pre-computed and stored in a memory. In this computation, only the fractional part of 2.75, the LLR value $L_2(2i)$, and the slope between $L_2(2i)$ and $L_2(3i)$ are used. The parameters (e.g., slopes and intercept terms) of all the piecewise linear lines of FIG. 4C may be pre-computed and stored into lookup tables indexed based on floor(Im(r)).

Figure 5:
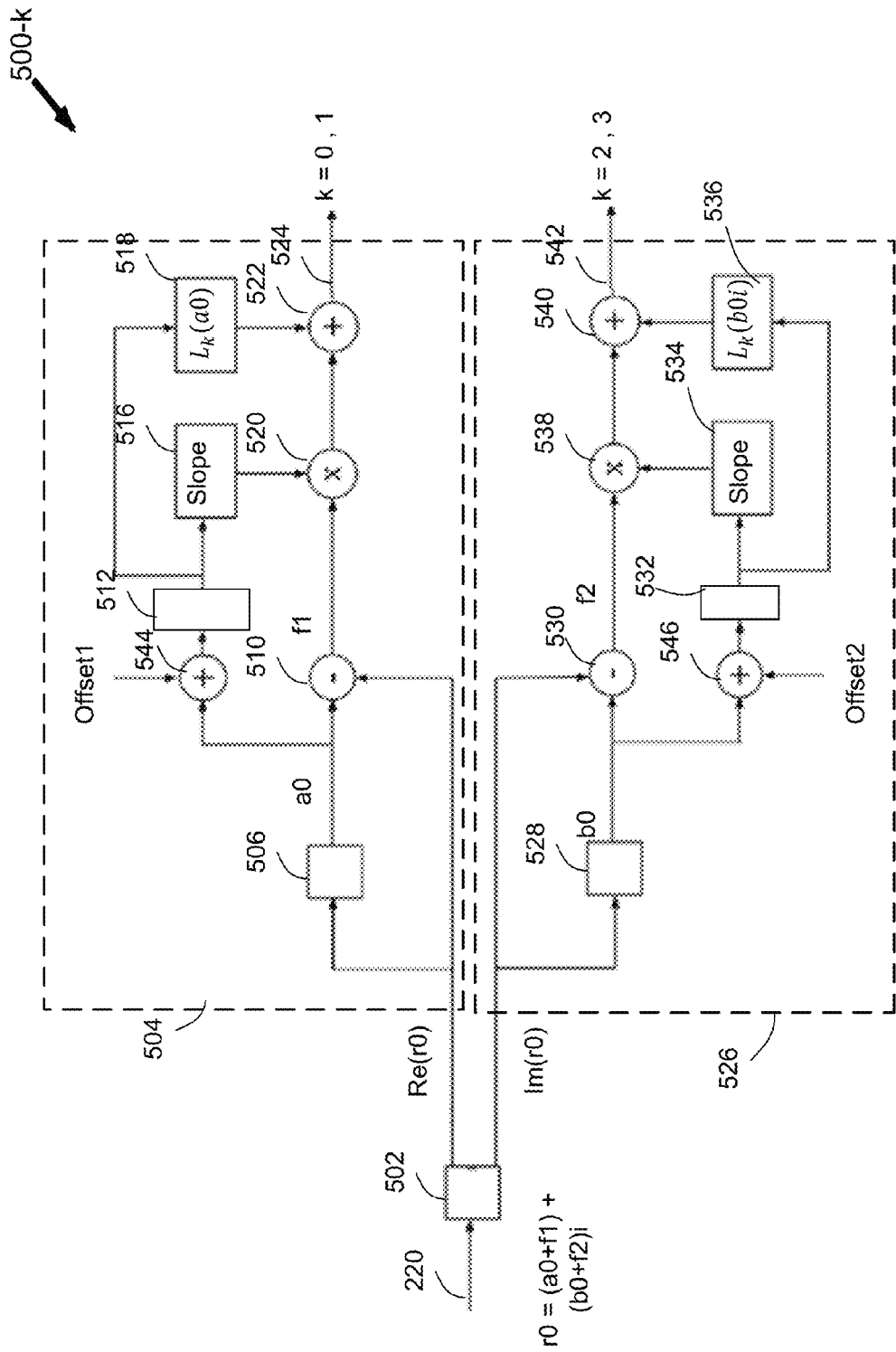
FIG. 5 is a block diagram illustrating an exemplary LLR computation bit unit according to some embodiments of the present disclosure.

Referring to FIG. 5, illustrated is a schematic view of an LLR computation bit unit for computing $L_k$ (r) in Gray coded modulations based on the piecewise linear characteristics of $L_k(r)$ of equation (2) as discussed above with reference to FIGS. 4A-4D. In the example of FIG. 5, LLR computation bit unit 500-k receives a received symbol 220, denoted as r0. The received symbol r0 may be expressed as a complex number as follows:

$$r0=(a0+f1)+(b0+f2)i,$$

where a0 and b0 are integer parts of Re(r0) and Im(r0) respectively, and f1 and f2 are fractional parts of Re(r0) and Im(r0) respectively. As shown in FIG. 5, the LLR computation bit unit 500-k includes a decomposition unit 502 for generating Re(r0) and Im(r0).

In some samples where $L_k(r)$ of a particular $k^{th}$ bit is piecewise linear as a function of Re(r) (e.g., $L_0(r)$ of FIG. 4A and $L_1(r)$ of FIG. 4B), Re(r0) is sent to real computation bit unit 504, which may compute $L_k(r0)$ as follows:

$$L_k(r0)=L_k(a0)+f1*\text{slope between } L_k(a0) \text{ and } L_k(a0+1).$$

For example, a flooring function unit 506 of real computation bit unit 504 receives Re(r0), and generates the integer part a0 of Re(r0). Real computation bit unit 504 further includes an adder/subtractor 510, which subtracts integer part a0 from Re(r0) to generate fractional part f1 of Re(r0). Integer part a0 may be sent to a lookup table 512 storing corresponding slopes and intercept terms for $L_k(r)$, where a slope 516 (e.g., slope between $L_k(a0)$ and $L_k(a0+1)$) and an intercept term 518 (e.g., $L_k(a0)$) is retrieved. Real computation bit unit 504 further includes a multiplier 520 and an adder/subtractor 522 to compute an output 524 having a value $L_k(r0)$ using the retrieved slope 516 and intercept term 518.

In some samples where $L_k(r)$ of a particular $k^{th}$ bit is piecewise linear as a function of Im(r) (e.g., $L_2(r)$ of FIG. 4C and $L_3(r)$ of FIG. 4D), Im(r0) of the received symbol r0 is sent to imaginary computation bit unit 526, which may compute $L_k(r0)$ as follows:

$$L_k(r0)=L_k(b0i)+f2*\text{slope between } L_k(b0i) \text{ and } L_k((b0+1)i).$$

For example, flooring function unit 528 of imaginary computation bit unit 526 receives Im(r0), and generates the integer part b0 of Im(r0). Imaginary computation bit unit 526 further includes an adder/subtractor 530, which subtracts integer part b from Im(r0) to generate fractional part f2 of Im(r0). Integer part b0 of Im(r0) may be sent to a lookup table 532 storing corresponding slopes and intercept terms for $L_k(r)$, where a slope 534 (e.g., slope between $L_k(b0i)$ and $L_k((b0+1)i)$) and an intercept term 536 (e.g., $L_k(b0i)$) is retrieved. Imaginary computation bit unit 526 further includes a multiplier 538 and an adder/subtractor 540 to compute an output 542 having a value $L_k(r0)$ using the retrieved slope 534 and intercept term 536.

In some embodiments, offsets may be applied to adjust the inputs to the lookup tables. In such embodiments, real computation bit unit 504 and imaginary computation bit unit 526 may adjust the inputs (e.g., a0, b0) to the lookup tables 512 and 532 using the offsets accordingly (e.g., by using adders 544 and 546). In an example, offsets may be chosen such that after applying the offsets to integer parts a0 and b0, the resulting values may be used as an index for the look up tables for the slopes.

Thus, to compute LLR of a single bit of a received symbol using the LLR computation bit unit 500-k of FIG. 5, only one additional addition (e.g., using adder 522 or adder 540) and one additional multiplication (e.g., using multiplier 520 or multiplier 538) is required. Note that the offset additions and fractional part computation to generate f1 and f2 do not incur additional computation for an additional bit, because the resulting values from the offset additions, f1, and f2 are the same across all bits of the received symbol, and may only need to be computed once. Furthermore, by using the LLR computation bit unit 500-k of FIG. 5, LLR computational complexity per bit remains constant as the order of modulation increases.

Referring to FIGS. 6, 7A, 7B, 8, and 9, in some embodiments, a communication system 200 of FIG. 2 uses non-Gray coded modulations schemes (e.g., non-Gray coded amplitude and phase-shift keying (APSK)). The LLR computation bit unit 500-k of FIG. 5 may not be applicable to such non-Gray coded modulations. First, in embodiments with non-Gray coded modulations, $L_k(r)$ of equation (2) may depend on both the real part and imaginary part of the received symbol r. As such, $L_k(r)$ for a particular k may not be computed using either a real part computation bit unit or an imaginary part computation bit unit as discussed above with reference to FIG. 5. Second, with non-Gray coded modulations, $L_k(r)$ may not be piecewise linear across the space for received symbols in constant intervals of one. Therefore, an LUT-based method for computing $L_k(r)$ as described above with reference to LLR computation bit unit 500-k of FIG. 5 may not compute LLRs of equation (2) in exact for non-Gray coded modulations. As such, the computational complexity to compute LLR in exact using equation (2) for non-Gray coded modulations is more costly compared to Gray coded modulations, because real and imaginary decomposition used in LLR computation bit unit 500-k of FIG. 5 may not be feasible for non-Gray coded modulations.

Figure 6:
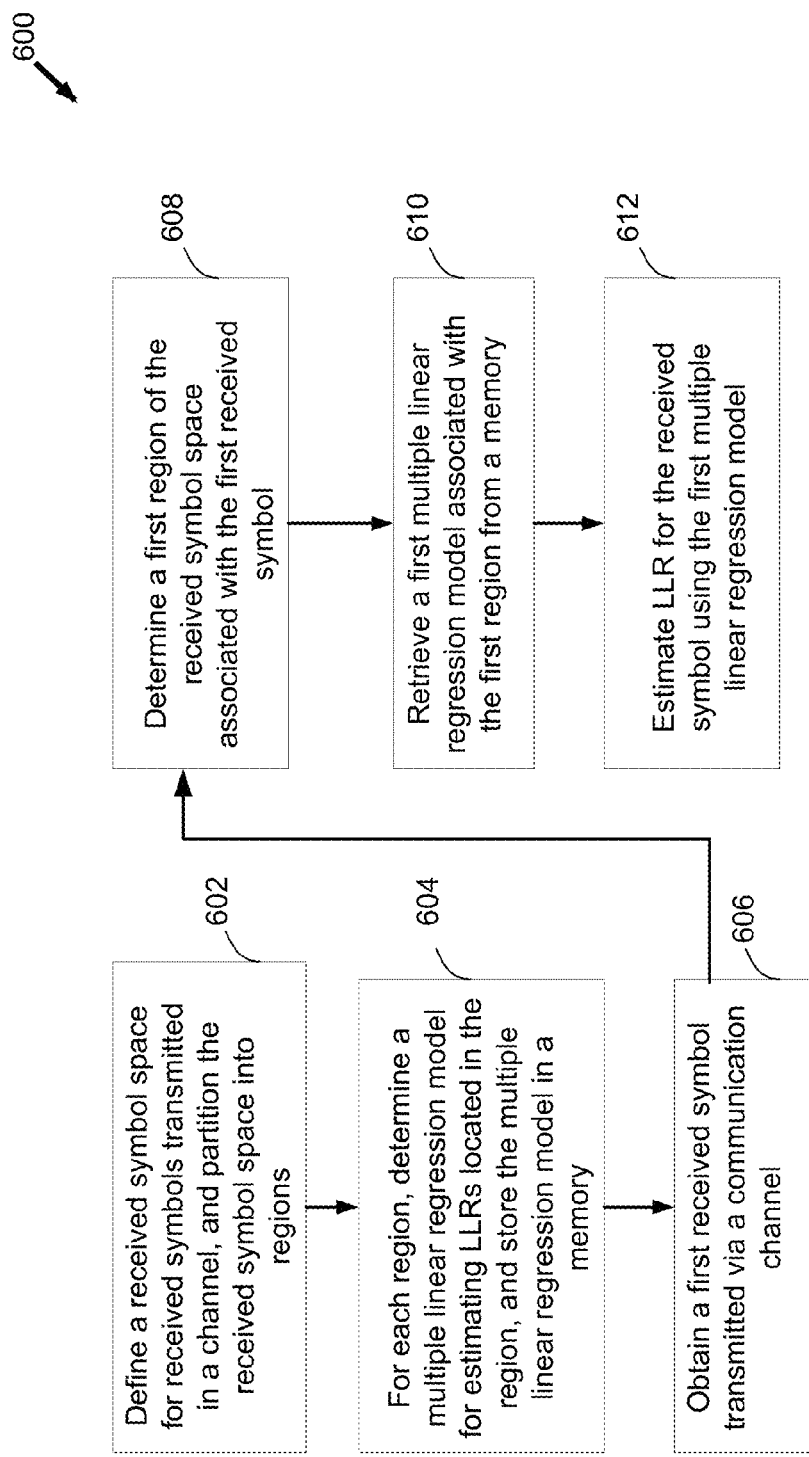
FIG. 6 is a flow diagram illustrating a method for computing LLR values according to some embodiments of the present disclosure.
Figure 7A:
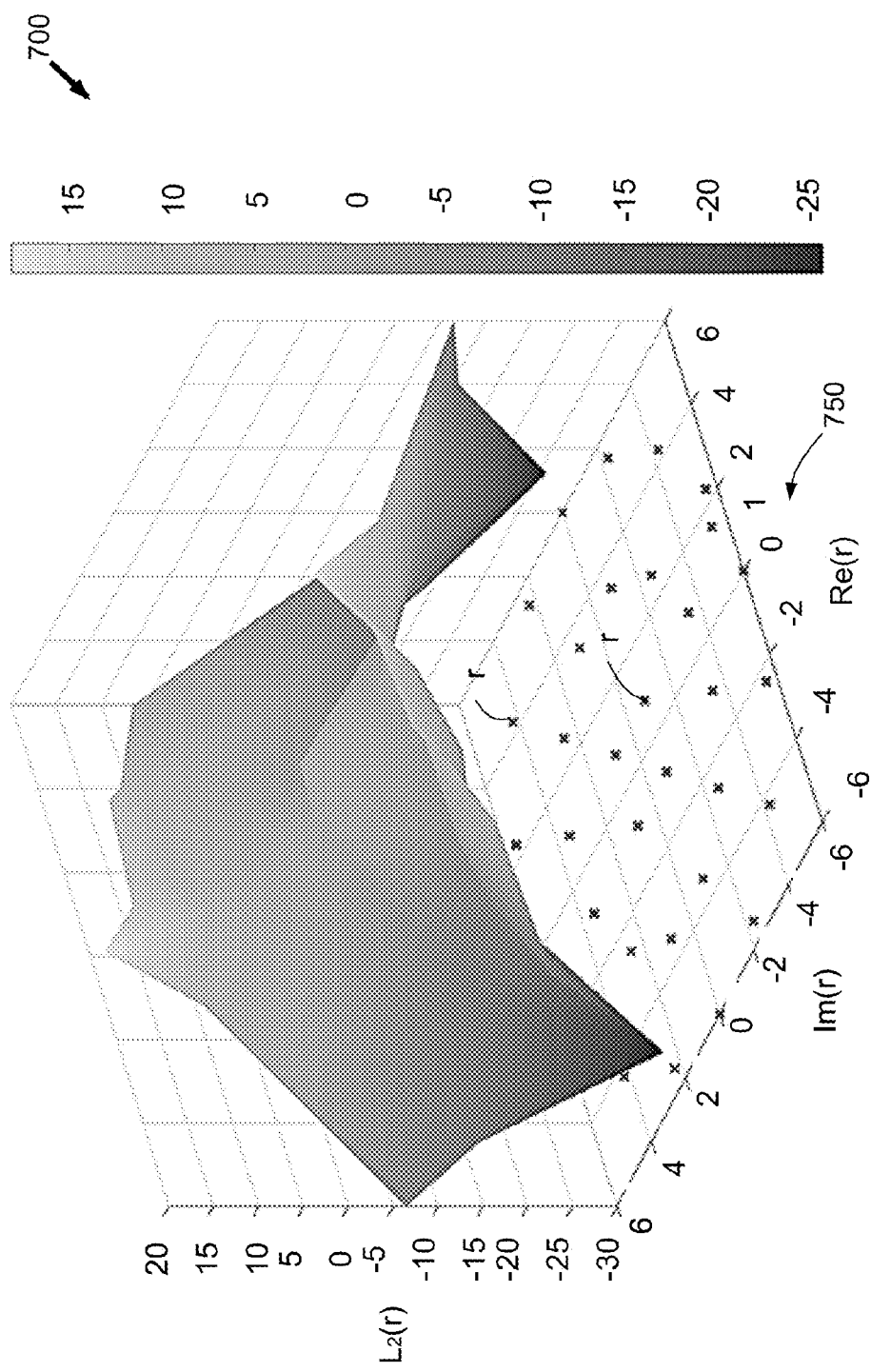
FIG. 7A is a surface plot of LLRs according to some embodiments of the present disclosure.

Referring to FIG. 6, illustrated is a flow chart of a method 600 for computing LLRs for modulations including both Gray coded modulations and non-Gray coded modulations. The method 600 may include a preparation process followed by real-time computations of LLRs. At blocks 602 and 604 of the method 600, during a preparation process, regression models are pre-computed and stored in a memory. At blocks 606, 608, 610, and 612, real-time computations for LLRs are performed based on pre-computed regression models retrieved from the memory. The method 600 begins at block 602 to define a space of received symbols (also referred as a received symbol space), and partition the received symbol space into a plurality of regions. Referring to FIG. 7A, illustrated is a surface plot 700 of $L_2(r)$ for received symbols r with a non-Gray coded modulation 32-APSK, where $L_2(r)$ is computed explicitly using equation (2). As shown in the surface plot 700, for received symbols with a non-Gray coded 32-APSK modulation, $L_2(r)$ of equation (2) may depend on both the real part and imaginary part of the received symbol r. Further, $L_2(r)$ is not piecewise linear in constant intervals of one.

Figure 7B:
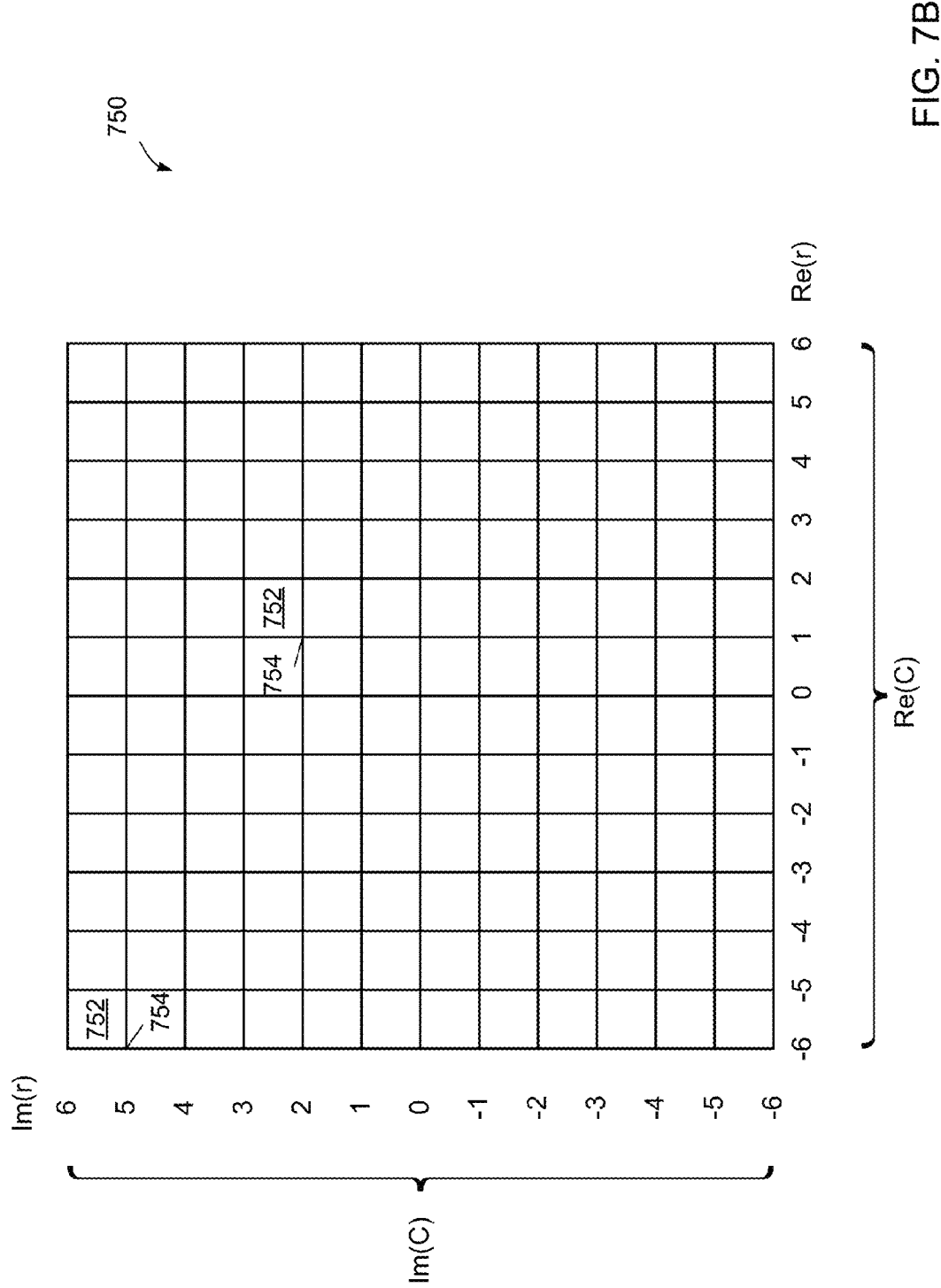
FIG. 7B is a block diagram illustrating a received symbol space according to some embodiments of the present disclosure.

Referring to FIGS. 7A and 7B, in some embodiments, all received symbols for data transmitted in a communication system 200 may be confined in a received symbol space 750, denoted as C. Received symbols r correspond to points in the received symbol space 750 respectively. At block 602, after determining the received symbol space 750, the received symbol space 750 is partitioned into a plurality of regions 752. In the example of FIG. 7B, received symbol space 750 includes a first dimension (Re(C)) corresponding to the real part of the received symbols, and a second dimension (Im(C)) corresponding to the imaginary part of the received symbols. In the example of FIG. 7B, each region 752 includes one unit in Re(C) and one unit in Im(C), and all regions 752 of the received symbol space 750 have the same size. A starting point 754 of a region 752 may correspond to a first integer in Re(C) and a second integer in Im(C). It is noted that regions 752 may have different sizes from each other, and may correspond to any number of units in Re(C) and/or Im(C).

Referring to FIG. 6, the method 600 proceeds to block 604, where for each region, a multiple linear regression model for estimating LLRs for received symbols is determined and saved in a memory. Referring to FIGS. 7A and 7B, for each region 752, a multiple linear regression model for estimating a bit of received symbols located in that particular region 752 is determined.

In some embodiments, for a particular region 752 having a starting point 754 with a value a+bi, a multiple linear regression model for estimating the $k^{th}$ bit of received symbols located in that particular region 752 may be expressed as follows:

$$\hat{L}_k(r) = L_k(a+bi) + f1 * t_1^{a,b} f2 * t_2^{a,b} f1 * f2 * t_3^{a,b},$$

where f1, f2, and f1*f2 are first, second, and third regressors (also referred to as independent variables) respectively, $t_1^{a,b}$, $t_2^{a,b}$, and $t_3^{a,b}$ are first, second, and third regression coefficients corresponding to the first, second, and third regressors respectively, and $L_k(a+bi)$ is an intercept coefficient (e.g., computed explicitly using equation (2)). In some examples, a and b are integers, f1 is associated with a fractional part of the real part of the received symbols, and f2 is associated with a fractional part of the imaginary part of the received symbols.

In some embodiments, regression coefficients $t_1^{a,b}$, $t_2^{a,b}$, and $t_3^{a,b}$ may be estimated using an ordinary least square (OLS) method. Such OLS estimation process may be based on $L_k(r)$ values (e.g., computed explicitly using equation 2) of sample received symbols located within that particular region 752. Two sets X and Y may be used to determine the sample received symbols. Let set $X = \{x_1, x_2, \ldots, x_N\}$ denote a set of strictly monotonic increasing numbers, $x_1 = 0$ and $x_N = 1$, and let set $Y = \{y_1, y_2, \ldots, y_M\}$ denote a set of strictly monotonic increasing numbers, where $y_1 = 0$ and $y_M = 1$. For each $(x_n, y_m)$ pair where n is an integer between 1 and N and m is an integer between 1 and M, the corresponding sample received symbol $r_s^{n,m}$ is located in the particular region 752, and may be expressed as $r_s^{n,m} = a + x_n + (b + y_m)i$.

In various embodiments, X and Y may be determined based on the accuracy requirements of the OLS estimates for regression coefficients $t_1^{a,b}$, $t_2^{a,b}$, and $t_3^{a,b}$. For example, if X and Y have larger cardinality with larger M and N, the OLS estimates may take longer to compute but are more accurate. In an example with symmetric modulations, elements of X and Y are evenly distributed between [0,1]. In such an example, X and Y may be identical. In an example with non-symmetric modulations, X and Y may be different (e.g., where M and N are different), and elements of X and Y may be not evenly distributed between [0, 1].

In some embodiments, for all sample received symbols $r_s^{n,m}$, $L_k(r_s^{n,m})$ is explicitly computed (e.g., according to equation (2)). A column vector $i^{a,b}$ including N*M elements is generated as follows:

$$i^{a,b} = \begin{pmatrix} L_k(r_s^{1,1}) \\ \ldots \\ L_k(r_s^{1,M}) \\ \ldots \\ L_k(r_s^{n,1}) \\ \ldots \\ L_k(r_s^{n,m}) \\ \ldots \\ L_k(r_s^{n,M}) \\ \ldots \\ L_k(r_s^{N,M}) \end{pmatrix}.$$

Further, values $(x_n, y_m, x_n*y_m)$ is computed for sample received symbol $r_s^{n,m}$ to generate a matrix H as follows, where the matrix H has N*M rows and three columns.

$$H = \begin{pmatrix} x_1, y_1, x_1 y_1 \\ x_1, y_2, x_1 y_2 \\ \ldots \\ x_1, y_M, x_1 y_M \\ x_2, y_1, x_2 y_1 \\ \ldots \\ x_N, y_M, x_N y_M \end{pmatrix}.$$

Regression coefficients vector $t^{a,b}$ may be estimated as follows:

$$t^{a,b} = (H^H H)^{-1} H^H (i^{a,b} - L_k(a+bi)),$$

where $L_k(a+bi)$ is explicitly computed (e.g., using equation (2)), and regression coefficients vector $t^{a,b}$ includes estimation for regression coefficients $t_1^{a,b}$, $t_2^{a,b}$, $t_3^{a,b}$ (also referred to as slope coefficients $t_1^{a,b}$, $t_2^{a,b}$, $t_3 a,b$), Regression coefficient $t_1^{a,b}$ corresponds to the first regressor f1, which is associated with a fractional part of a real part of received symbol r. Regression coefficient $t_2^{a,b}$ corresponds to the second regressor f2, which is associated with a fractional part of an imaginary part of received symbol r. Regression coefficient $t_3^{a,b}$ corresponds to the third regressor f1*f2.

At block 604, for each region 752 in the received symbol space 750, for each bit index k, a multiple linear regression is determined starting point LLR value $L_k(r)$ is computed according to equation (2). The parameters of multiple linear regression model, including for examples, the intersect coefficient $L_k(a+bi)$ and regression coefficients $t_1^{a,b}$, $t_2^{a,b}$, $t_3^{a,b}$, may be stored in a lookup table as lookup table coefficients indexed by the integers a, b, and/or bit index k.

Figure 8:
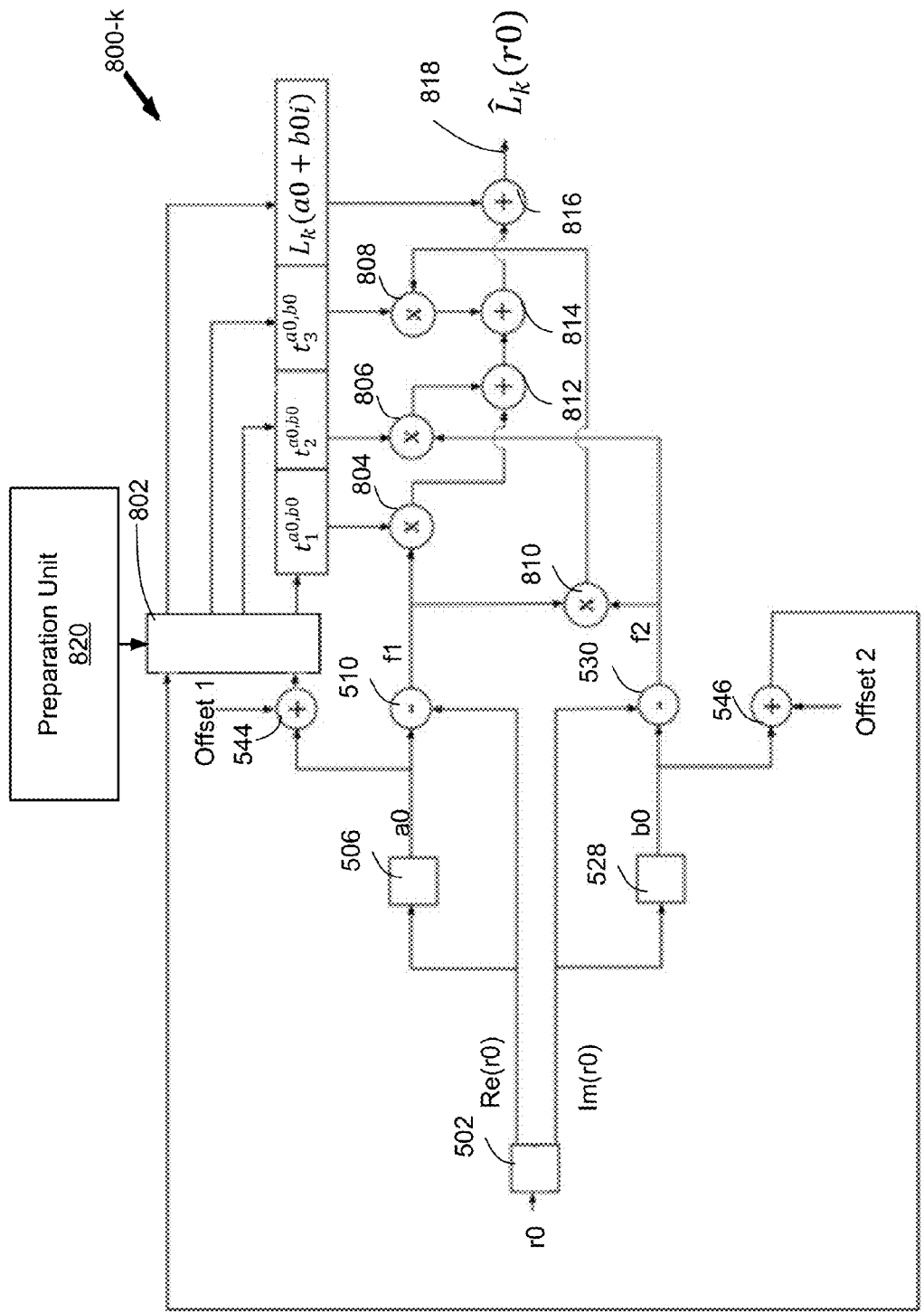
FIG. 8 is a block diagram illustrating an exemplary LLR computation bit unit according to some embodiments of the present disclosure.

Referring to FIG. 8, illustrated is an LLR computation bit unit 800-k for computing LLRs for received symbols with a non-Gray coded modulation. Such an LLR computation bit unit 800-k may be used as the LLR computation bit unit 300-k of FIG. 3 in the LLR computation system 222. LLR computation bit unit 800-k includes a lookup table 802 coupled to a preparation unit 820. In some embodiments, the preparation unit 820 performs a preparation process including blocks 602 and 604, and stores the parameters of multiple linear regression models in lookup table 802.

Referring to FIG. 6, the method 600 then proceeds to block 606, where a received symbol transmitted via a communication channel is obtained. In an example, the LLR computation system 222 obtains received symbol r0, and sends received symbol r0 to an input of the LLR computation bit unit 800-k.

The method 600 then proceeds to block 608, where a region of the received symbol space is determined for received symbol r0. The received symbol r0 may be expressed as a0+f1+(b0+f2)i, where a0 and b0 are integer parts of Re(r0) and Im(r0) respectively, and f1 and f2 are fractional parts of Re(r0) and Im(r0) respectively. Such a region may be determined based on regions partitioned during the preparation process at block 602. As discussed above with reference to FIG. 7B, in the example of FIG. 7B, at block 602, the received symbol space 750 is partitioned into regions 752, where each region 752 is a 1×1 unit, and a starting point 754 of the region 752 corresponds to integers in both dimensions. As such, at block 608, a first region of received symbol space 750 is determined for the received symbol r0, where the first region is a 1×1 unit, and a starting point 754 of the first region has a value a0+b0i.

Referring to FIG. 6, the method 600 then proceeds to block 610, where a first multiple linear regression model associated with the first region is retrieved from a memory. Referring to the example of FIG. 8, Re(r0) of the received symbol r0 is sent to a flooring function unit 506 to generate a0. Im(r0) of the received symbol r0 is sent to a flooring function unit 528 to generates b0.

In some embodiments, a0 and b0 may be used as an identifier of the first region for retrieving the corresponding multiple linear regression model from a memory. In the examples of FIG. 8, a0 and b0 are sent to a lookup table 802. Parameters of a multiple linear regression model, including for example, $L_k$ (a0+b00, $t_1^{a0,b0}$, $t_2^{a0,b0}$, $t_3^{a0,b0}$ are retrieved from the lookup table 802 using a0 and b0 for a particular bit index k.

In some embodiments, a0 and b0 may be adjusted by offsets respectively, and the adjusted values are sent to the lookup table 802 for retrieving the multiple linear regression model for the first region. In an example, offsets may be chosen such that after applying the offsets to integer parts a0 and b0, the resulting adjusted values may be used as an index for the look up tables.

Referring to FIG. 6, the method 600 proceeds to block 610, where LLR for the $k^{th}$ bit of the received symbol r0 is computed using the retrieved parameters of a multiple linear regression model. Referring to FIG. 8, an adder/subtractor 510 subtracts a0 from Re(r0) to generate fractional part f1 of Re(r0). An adder/subtractor 530 subtracts b0 from Im(r0) to generate fractional part f2 of Im(r0). The LLR computation bit unit 800-k of FIG. 8 further includes multipliers 804, 806, 808, and 810 and adders 812, 814, and 816 to compute an output 818 having a value $L_k$(r0) as follows:

$$\hat{L}_k(r0)=L_k(a0+b0i)+f1*t_1^{a0,b0}f2*t_2^{a0,b0}f1*f2*t_3^{a0,b0}. \quad \text{Equation (3)}$$

Thus, to compute LLR of a single bit using the LLR computation bit unit 800-k of FIG. 8, about three additional additions (e.g., using adders 812, 814, and 816) and four additional multiplications (e.g., using multipliers 804, 806, 808, and 810) are required. Note that the offset additions and fractional part computation to generate f1 and f2 do not incur additional computation for an additional bit, because the resulting values of those computations are the same across all bits of the received symbol, and may only need to be computed once.

Furthermore, by using the LLR computation bit unit 800-k of FIG. 8, LLR computational complexity per bit remains constant as the order of modulation increases, which improves the efficiency of the LLR computation system 222. On the other hand, for non-Gray coded modulations, the number of arithmetic operations required to compute LLR directly using equation (2) increases linearly with the order of modulation. In an example with 256-ary modulation, computing LLR directly using equation (2) may require 256 multiplications, 257 subtractions, and an operation for finding the minimum elements in two vectors of length 128. In that example, arithmetic operations required using direction computation of equation (2) are almost two orders of magnitude more than arithmetic operations required by using the LLR computation bit unit 800-k of FIG. 8.

Figure 9:
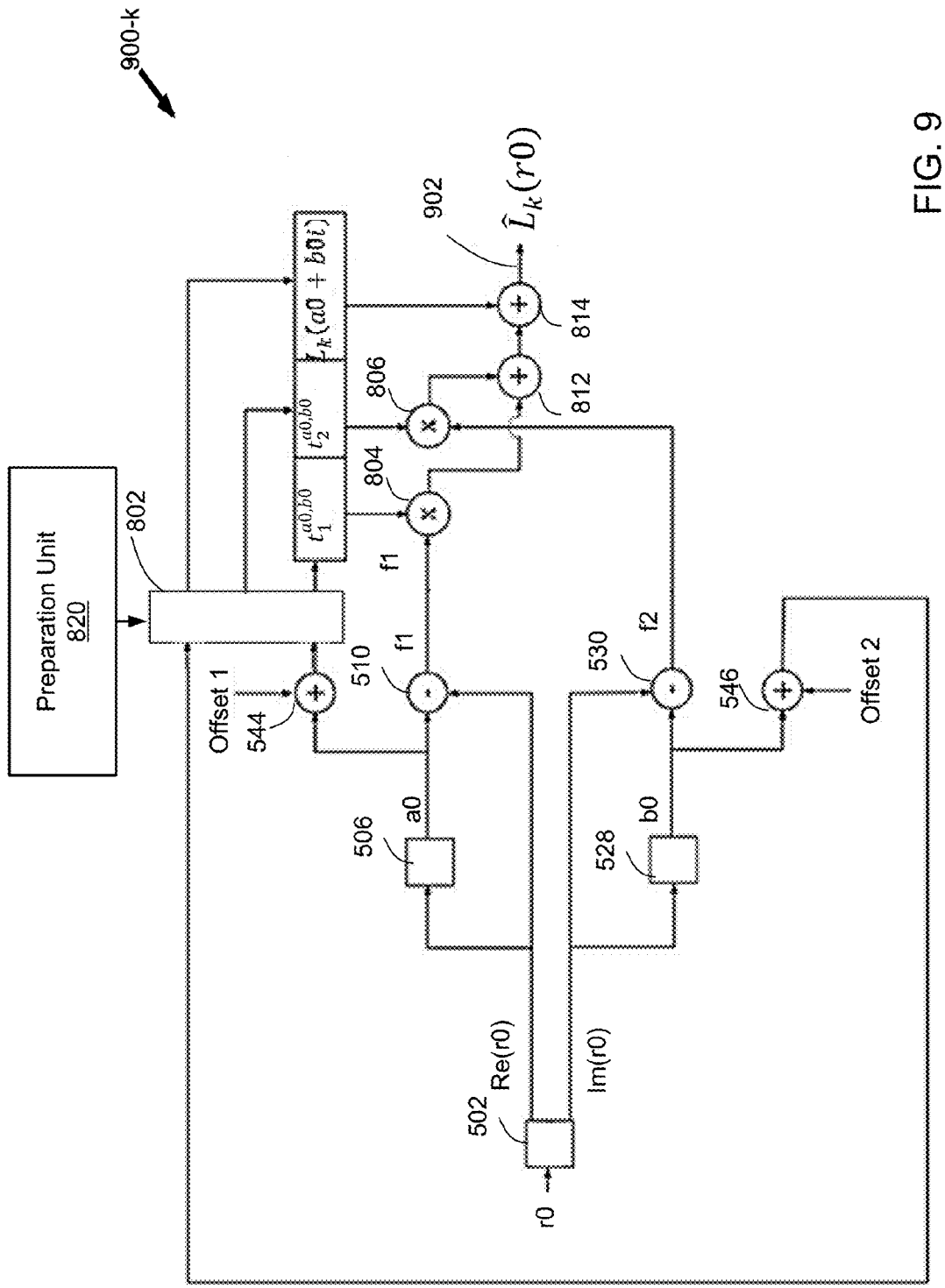
FIG. 9 is a block diagram illustrating an exemplary LLR computation bit unit according to some embodiments of the present disclosure.

Referring to FIG. 9, in some embodiments, the multiple linear regression model may not include the third regressor f1*f2. In other words, the term $f1*f2*t_3^{a0,b0}$ may be removed from the computation, and LLRs may be computed as follows:

$$\hat{L}_k(r0)=L_k(a0+b0i)+f1*t_1^{a0,b0}f2*t_2^{a0,b0}. \quad \text{Equation (4)}$$

In some embodiments, LLR computation bit unit 800-k of FIG. 8 may be configured to exclude the term $f1*f2*t_3^{a0,b0}$ in computing $L_k$(r0). LLR computation bit unit 900-k of FIG. 9 illustrates such an embodiment. LLR computation bit unit 900-k of FIG. 9 is substantially similar to LLR computation bit unit 800-k of FIG. 8, except that LLR computation bit unit 900-k may not include components (e.g., multiplier 808 and 810 and adder 814) for computing the term $f1*f2*t_3^{a0,b0}$. The LLR computation bit unit 900-k provides an output 902 having the estimated 4(r0) computed according to equation (4).

Thus, to compute LLR of a single bit using the LLR computation bit unit 900-k of FIG. 9, only two additional additions (e.g., using adders 812 and 814) and two additional multiplications (e.g., using multipliers 804 and 806) are required. In some embodiments, the mean square error between $L_k$(r0) explicitly computed using equation (2) and $L_k$(r0) computed using equation (3) with $f1*f2*t_3^{a0,b0}$ is less than (e.g., by up to about 50%) the mean square error between $L_k$(r0) explicitly computed using equation (2) and $L_k$(r0) computed using equation (4) without $f1*f2*t_3^{a0,b0}$.

In some embodiments, after block 612, the method 600 may repeat blocks 610 and 612 to compute LLRs for all bits of the received symbol, using different multiple linear regression models for different bit indexes respectively.

Figure 10:
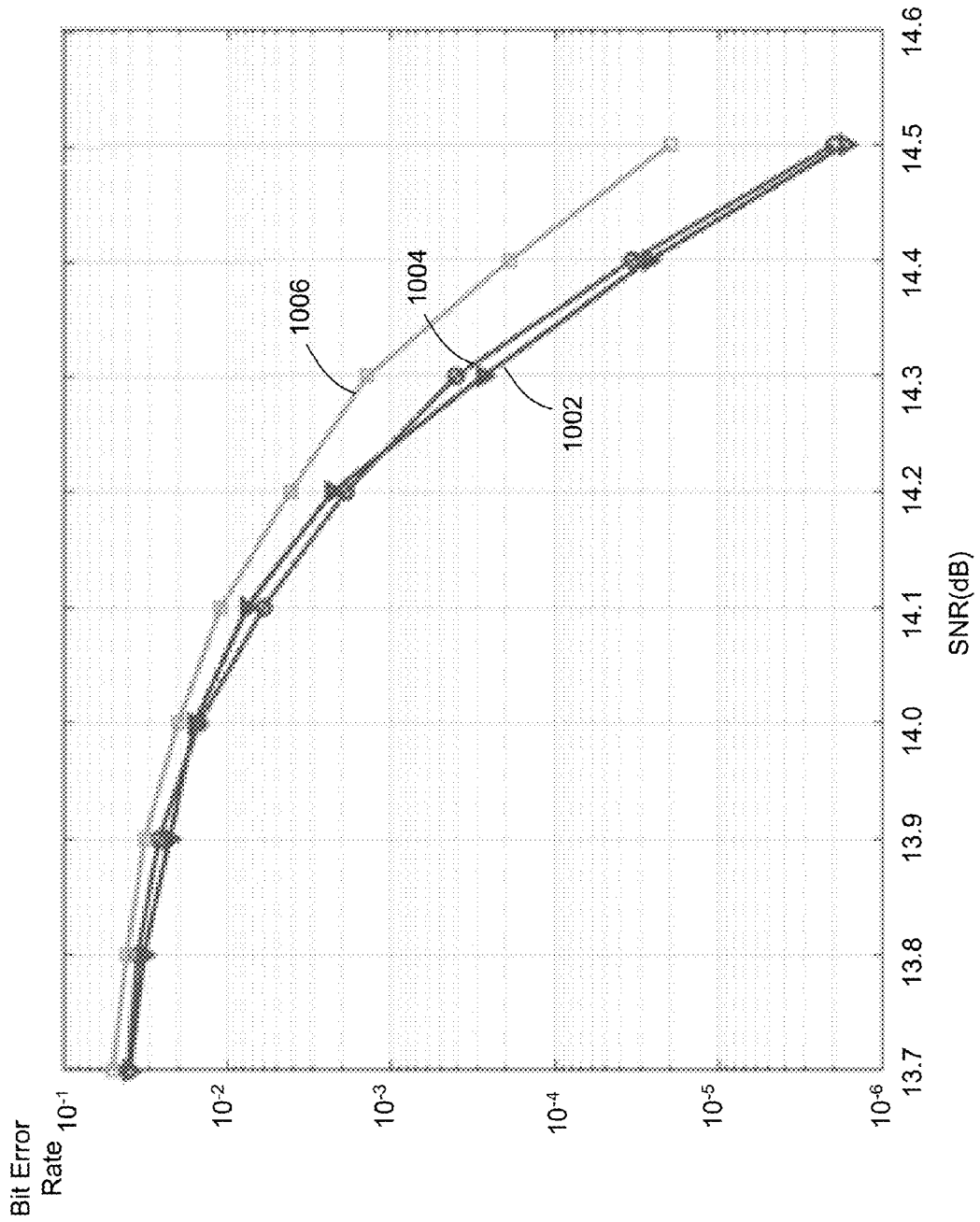
FIG. 10 illustrates performance comparisons between various embodiments according to the present disclosure.

Referring to FIG. 10, performance comparisons between various embodiments of LLR computation system 222 for non-Gray coded modulations are illustrated. Specifically, in the example of FIG. 10, the decoding performances of an error correcting code with LLRs that are computed in exact according to equation (2) (denoted as ($L_k$(r)) and LLRs are computed using locally estimated regression models (denoted as ($\hat{L}_k$(r)) are compared. The error correcting code is a low-density parity-check (LDPC) code decoder with a code rate of 4/5, a block length of 10240 bits, and scaled min-sum decoding over 32 APSK modulation. Curve 1002 illustrates the bit error rate (BER) performance corresponding to $L_k(r)$ computed in exact according to equation (2). Curve 1004 illustrates the bit error rate performance corresponding to $\hat{L}_k(r)$ estimated according to equation (3) using LLR computation bit unit 800-k. Curve 1006 illustrates the bit error rate performance corresponding to $L_k(r)$ estimated according to equation (4) using LLR computation bit unit 900-k. As shown by curves 1002, 1004 and 1006, bit error rate performances of embodiments using $\hat{L}_k(r)$ may become very close to the bit error rate performance of embodiments using $L_k(r)$. $\hat{L}_k(r)$. Furthermore, as shown by curves 1004 and 1006, while both bit error rate performances of using $\hat{L}_k(r)$ of equation (3) with $f1*f2*t_3^{a,b}$ and using $\hat{L}_k(r)$ of equation (4) without $f1*f2*t_3^{a,b}$ may be satisfactory, using $\hat{L}_k(r)$ of equation (3) achieves a better bit error performance. As such, whether to include the term $f1*f2*t_3^{a,b}$ in computing $\hat{L}_k(r)$ may be determined according to specific performance requirements (e.g., BER performance requirement), and an LLR computation bit unit may be configured to include or exclude the term $f1*f2*t_3^{a,b}$ in computing $\hat{L}_k(r)$ accordingly.

It is noted that various configurations illustrated in FIGS. 2, 3, 4A, 4B, 4C, 4D, 5, 6, 7A, 7B, 8, 9, and 10 are exemplary only and not intended to be limiting beyond what is specifically recited in the claims that follow. It will be understood by those skilled in that art that other configurations may be used. For example, the method 600 and LLR computation bit units 800-k and 900-k may be extended to higher dimensional modulations (e.g., 3-dimensional modulation) by including regressors corresponding to the additional dimensions. For further example, while an LDPC code decoder and 32-APSK are used in the examples, different types of error correction codes over different modulations may be used.

Various advantages may be present in various applications of the present disclosure. No particular advantage is required for all embodiments, and different embodiments may offer different advantages. One of the advantages of some embodiments is that LLR estimations using locally estimated regression models may not require any symmetry in the symbol-to-bit mapping of a modulation. As such, the LLR estimations may be used for any modulation, including Gray-coded modulations and non-Gray coded modulations. Another of the advantages of some embodiments is that for non-Gray coded modulations, LLR estimations may be achieved by using pre-computed regression models stored in a lookup table, which significantly improves the efficiency of LLR computation for non-Gray coded modulations. In an example, for non-Gray coded modulations, arithmetic operations required by such LLR estimations are less than arithmetic operations required by direct LLR computations according to equation (2) by a number of (e.g., two, three) orders of magnitude. Yet another advantage of the advantages of some embodiments is that LLR estimations using such locally estimated regression models may be extended to higher dimensional modulations by including regressors corresponding to the additional dimensions.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A method, comprising:
    communicating data in a channel, wherein received symbols for the data correspond to points of a received symbol space respectively, and wherein first and second dimensions of the received symbol space correspond to a real part and an imaginary part of the received symbols respectively;
    partitioning the received symbol space into a plurality of regions;
    for each region of the plurality of regions, determining a regression model associated with a bit of a plurality of bits of the received symbols;
    obtaining a first received symbol for the data;
    determining a first region of the plurality of regions of the received symbol space for the first received symbol; and
    estimating a first log-likelihood ratio (LLR) for a first bit of the first received symbol using a first regression model associated with the first region and the first bit of the first received symbol, wherein the first regression model includes a plurality of regressors.

2. The method of claim 1, wherein the data is modulated with a non-Gray coded modulation.

3. The method of claim 2, wherein the first regression model is a multiple linear regression model including:
    a first regressor associated with a real part of the first received symbol; and
    a second regressor associated with an imaginary part of the first received symbol.

4. The method of claim 3, wherein the first regression model includes:
    a third regressor associated with a product of the first regressor and the second regressor.

5. The method of claim 3, wherein the first regression model includes an intercept coefficient determined based on a second LLR corresponding to a starting point of the first region.

6. The method of claim 5, wherein the starting point of the first region corresponds to a first integer part of the real part of the first received symbol in the first dimension, and corresponds to a second integer part of the imaginary part of the first received symbol in the second dimension.

7. The method of claim 3, wherein the first regressor corresponds to a fractional part of the real part of the first received symbol, and
    wherein the second regressor corresponds to a fractional part of the imaginary part of the first received symbol.

8. The method of claim 1, further comprising:
    prior to communicating the data in the channel,
    for each region of the plurality of regions,
    storing the regression model in a storage.

9. The method of claim 1, wherein the determining the regression model for each region of the plurality of regions includes:
    estimating a plurality of regression coefficients of the regression model based on LLRs corresponding to sample points of the region using an ordinary least squares (OLS) method.

10. The method of claim 1, wherein each region has a first length of one in the first dimension and a second length of one in the second dimension.

11. An integrated circuit (IC), comprising:
a preparation circuit configured to:
  partition a received symbol space associated with data communicated in a channel into a plurality of regions;
  for each region of the plurality of regions, determine a regression model associated with a bit of a plurality of bits of received symbols; and
a log-likelihood ratio (LLR) computation circuit configured to:
  obtain a first received symbol for the data communicated in the channel;
  determine a first region of the received symbol space associated with the first received symbol, wherein the received symbol space has first and second dimensions corresponding to a real part and an imaginary part of received symbols for the data communicated in the channel respectively;
  retrieve a first regression model associated with the first region and a first bit of the first received symbol, wherein the first regression model includes a plurality of regressors; and
  estimate a first LLR for the first bit of the first received symbol using the first regression model.

12. The IC of claim 11, wherein the data is modulated with a non-Gray coded modulation.

13. The IC of claim 12, wherein the first regression model is a multiple linear regression model including:
  a first regressor associated with a real part of the first received symbol; and
  a second regressor associated with an imaginary part of the first received symbol.

14. The IC of claim 13, wherein the first regression model includes:
  a third regressor associated with a product of the first regressor and the second regressor.

15. The IC of claim 13, wherein the first regression model includes an intercept coefficient determined based on a second LLR corresponding to a starting point of the first region.

16. The IC of claim 15, wherein the starting point of the first region corresponds to a first integer part of the real part of the first received symbol in the first dimension, and corresponds to a second integer part of the imaginary part of the first received symbol in the second dimension.

17. The IC of claim 13, wherein the first regressor corresponds to a fractional part of the real part of the first received symbol, and
  wherein the second regressor corresponds to a fractional part of the imaginary part of the first received symbol.

18. The IC of claim 11, further comprising:
  a storage coupled to the LLR computation circuit;
  wherein the preparation circuit is configured to:
    prior to communicating the data in the channel,
      for each region of the plurality of regions,
        store the regression model in the storage.

19. The IC of claim 11, wherein to determine the regression model for each region, the preparation circuit is configured to:
  estimate a plurality of regression coefficients of the regression model based on LLRs corresponding to sample points of the region using an ordinary least squares (OLS) method.

20. The IC of claim 11, wherein each region of the plurality of regions of the received symbol space has a first length of one in the first dimension and a second length of one in the second dimension.

* * * * *